Figures 1, 2:
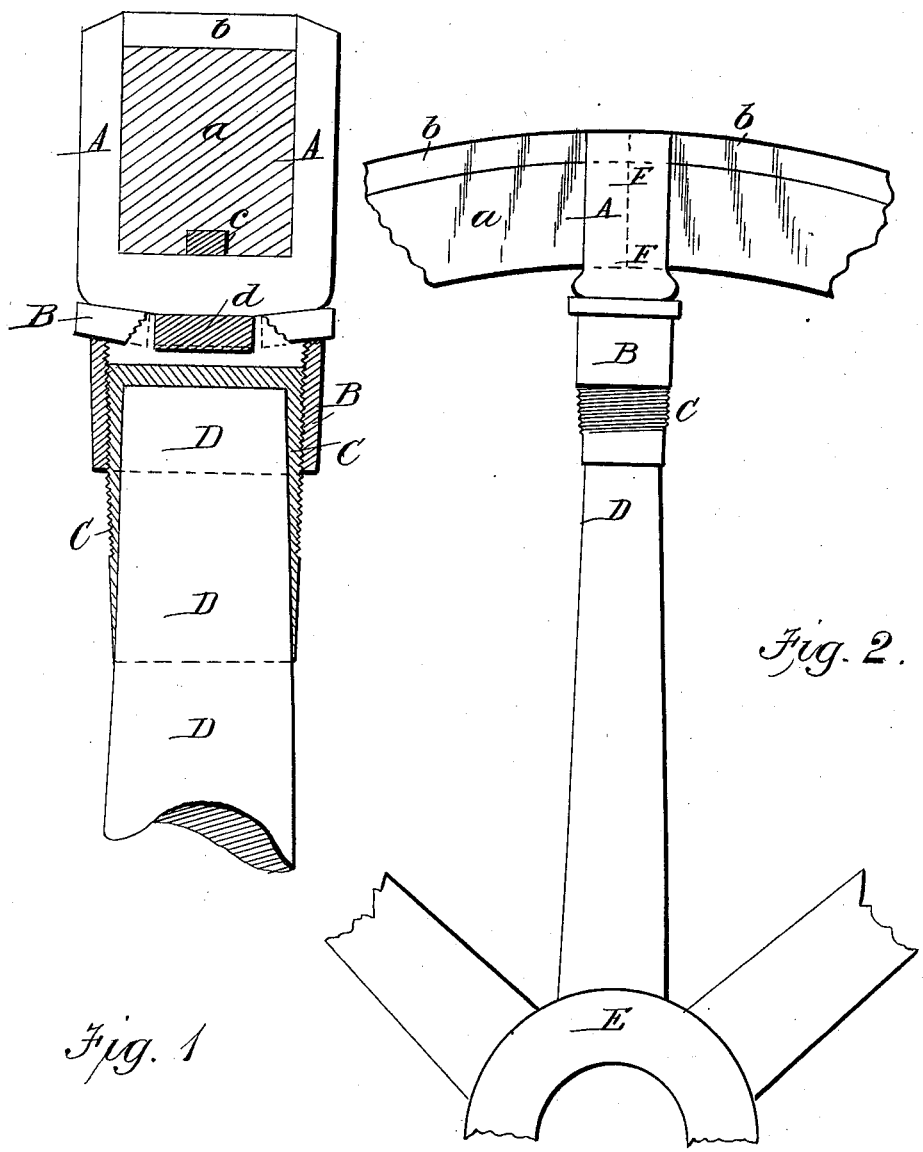

(No Model.)

J. N. RACHELS.
SPOKE AND FELLY ADJUSTER.

No. 602,268. Patented Apr. 12, 1898.

Witnesses:
Franck L. Ourand.

Inventor:
Jasper N. Rachels
Attorneys

UNITED STATES PATENT OFFICE.

JASPER NEWTON RACHELS, OF JUDSONIA, ARKANSAS, ASSIGNOR TO MOSES WOFFARD AND MARY M. RACHELS, OF SAME PLACE.

SPOKE AND FELLY ADJUSTER.

SPECIFICATION forming part of Letters Patent No. 602,268, dated April 12, 1898.

Application filed September 25, 1897. Serial No. 653,062. (No model.)

*To all whom it may concern:*

Be it known that I, JASPER NEWTON RACHELS, a citizen of the United States, residing at Judsonia, in the county of White and State of Arkansas, have invented certain Improvements in Tire-Tighteners for Vehicle-Wheels, of which the following is a full, clear, and exact specification.

The invention relates to improved means for tightening the tires of vehicle-wheels without the necessity of removing the tire and again shrinking it on the wheel, as is the method commonly in use.

The object of the invention is to provide an improved construction of the same which shall possess superior advantages with respect to efficiency in use.

The invention consists in the novel construction and combination of parts hereinafter fully described and claimed.

In the accompanying drawings, Figure 1 is a transverse sectional view taken through one of the fellies of a vehicle-wheel provided with my improvements. Fig. 2 is an elevation of the same.

In the said drawings the reference-letter $a$ designates the felly of a vehicle-wheel of any ordinary or suitable construction, and $b$ the tire thereof.

The letter A designates a U-shaped clip the sides of which embrace the sides of the felly, while the upper ends are beveled and flush, or approximately so, with the said tire. The horizontal portion of said clip on its outer side is formed with a lug $c$, which engages with a recess in the inner side of the felly. The inner side of said horizontal portion of the clip is formed with a cylindrical stud $d$, which engages with a circular recess in a hollow nut B, formed with interior screw-threads. This nut engages with an exteriorly-threaded thimble C on the outer end of the spoke D. This thimble is tapered from the outer to the inner end, as seen more clearly in Fig. 1.

In practice should the tire become loose the nut B is rotated, which will force the clip outward and also force the felly tightly against the tire, so as to tighten the latter.

Having thus fully described my invention, what I claim is—

In a tire-tightening device for vehicle-wheels, the combination with the felly having a recess in its inner side, and the tire, of the U-shaped clip comprising the horizontal and vertical portions, the lug on the horizontal portion engaging with said recess, and said horizontal portion formed on its inner side with a cylindrical stud, the hollow rotatable nut formed with an opening with which said stud engages, the exteriorly-threaded thimble, tapered to form a sharp inner end and the spoke with which said thimble engages, substantially as described.

JASPER NEWTON RACHELS.

Witnesses:
GEO. L. SCHAEFFER,
MERVY U. H. GREER.